(12) United States Patent
Isoyama et al.

(10) Patent No.: US 8,284,821 B2
(45) Date of Patent: Oct. 9, 2012

(54) VEHICLE-MOUNTED RELAY CONNECTION UNIT

(75) Inventors: Yoshikazu Isoyama, Yokkaichi (JP); Shigeo Hayashi, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 342 days.

(21) Appl. No.: 12/745,587

(22) PCT Filed: Jan. 7, 2009

(86) PCT No.: PCT/JP2009/050064
§ 371 (c)(1),
(2), (4) Date: Jun. 11, 2010

(87) PCT Pub. No.: WO2009/088005
PCT Pub. Date: Jul. 16, 2009

(65) Prior Publication Data
US 2010/0303133 A1 Dec. 2, 2010

(30) Foreign Application Priority Data
Jan. 9, 2008 (JP) .................................. 2008-002273

(51) Int. Cl.
*H04B 7/17* (2006.01)
(52) U.S. Cl. ........ 375/211; 375/316; 375/295; 375/214; 375/219; 375/220; 701/1; 701/36; 370/464; 370/498; 709/223; 709/249; 719/314; 719/312
(58) Field of Classification Search .................. 375/316, 375/295, 211, 214, 219, 220; 701/1, 36; 370/464, 498; 709/223, 249; 719/314, 312
See application file for complete search history.

(56) References Cited

U.S. PATENT DOCUMENTS
2003/0156595 A1 8/2003 Kishigami et al.

FOREIGN PATENT DOCUMENTS
| JP | A-09-162917 | 6/1997 |
|----|-------------|--------|
| JP | A-2002-368786 | 12/2002 |
| JP | A-2003-244180 | 8/2003 |

OTHER PUBLICATIONS
International Search Report issued in Application No. PCT/JP2009/050064; Mailed on Feb. 3, 2009 (With Translation).

*Primary Examiner* — Siu Lee
(74) *Attorney, Agent, or Firm* — Oliff & Berridge, PLC

(57) ABSTRACT

A message is efficiently relayed in a cut-through mode to a communication line of the transmission destination of a transmission rate higher than that of the communication line of the recipient while preventing the state that there is no data to be transmitted. A vehicle-mounted relay connection unit is used to relay messages received through first CAN communication lines to a second CAN communication line of a transmission rate higher than that of the first transmission lines in a cut-though mode. A relaying section measures the time difference between the time when the reception of the control field of a message among the messages simultaneously received through the first CAN communication lines is completed earliest and the time when the reception of the control field of another message is completed, determines the transmission waiting time from the completion of the reception of the control field of each message, and first relays the message such that the sum of the transmission waiting time and the time difference of the reception completion is small to the second CAN communication line.

11 Claims, 5 Drawing Sheets

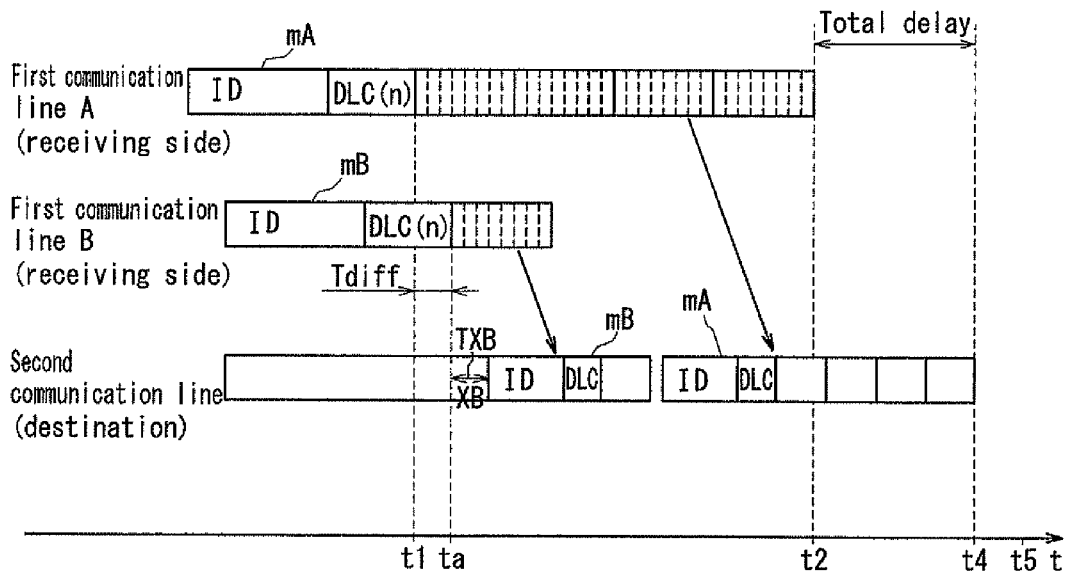
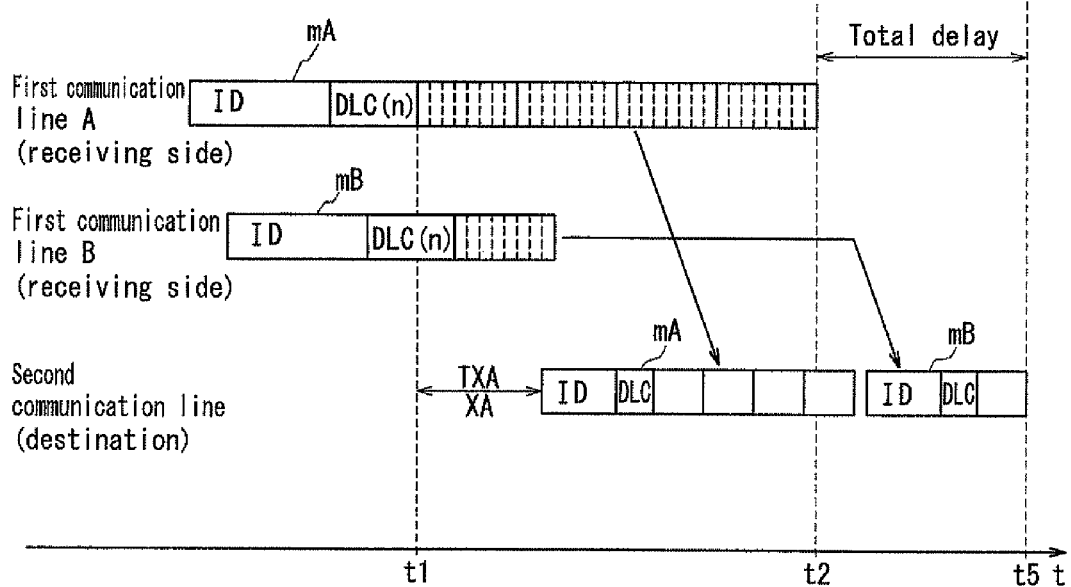

Fig. 6

| DLC (n) | Transmission speed ratio(R) | | |
|---|---|---|---|
| | 2 | 4 | 8 |
| 0 | 0 | 0 | 0 |
| 1 | 0 | 3 | 7 |
| 2 | 1 | 10 | 15 |
| 3 | 5 | 17 | 23 |
| 4 | 10 | 25 | 32 |
| 5 | 15 | 32 | 40 |
| 6 | 20 | 39 | 49 |
| 7 | 25 | 46 | 57 |
| 8 | 29 | 53 | 65 |

Fig. 7

| DLC (n) | Transmission speed ratio(R) | | |
|---|---|---|---|
| | 2 | 4 | 8 |
| 0 | 0 | 0 | 0 |
| 1 | 0 | 0 | 4 |
| 2 | 0 | 5 | 12 |
| 3 | 0 | 12 | 21 |
| 4 | 0 | 20 | 29 |
| 5 | 5 | 27 | 38 |
| 6 | 10 | 34 | 46 |
| 7 | 15 | 41 | 54 |
| 8 | 19 | 48 | 63 |

VEHICLE-MOUNTED RELAY CONNECTION UNIT

TECHNICAL FIELD

The present invention relates to a relay connection unit to be mounted on a car. More particularly the present invention is intended to send all messages securely and efficiently when transmission speeds of communication lines connected to a relay connection unit are different from each other and the transmission speed of a sending side is higher than that of a receiving side.

BACKGROUND ART

A communication system to be mounted on a car is heretofore adopted in which electronic control units (ECUs) for controlling the operation of apparatuses mounted on the car are connected to each other with communication lines connected to each other via a relay connection unit (gateway apparatus), and messages sent and received among the ECUs belonging to different communication lines are relayed by the relay connection unit.

Upon reception of a message from the ECU connected to one communication line, the relay connection unit relays the message to other communication lines to which the message is to be relayed.

In detail, the relay connection unit has a routing map in which the correspondence between an identifier of a received message and the communication line connected to the ECU to which the message is to be relayed is described. Upon receipt of the message, the relay connection unit reads the identifier thereof and determines a communication line, corresponding to the identifier thereof, to which the message is sent with reference to the routing map, thus sending the message to the identified communication line.

As a method of relaying the relay connection unit, a cut-through system is known, as described in Japanese Patent Application Laid-Open No. 9-162917.

As shown in FIG. 8, in the cut-through system, the relay connection unit receives a message from a communication line (receiving-side bus). At a time point tb when the relay connection unit has received an arbitration field (ID) of the message in which a message identifier is written, the relay connection unit determines a communication line (destination bus), corresponding to the message identifier, to which the message is to be relayed with reference to the routing map and starts to send the message to the communication line. Because the relay connection unit starts to send the message to the communication line without receiving the message to the end, the period of time required from the time the message is received till the transmission of the message is started is shorter than that required in a store & forward system in which transmission of the message is started after the message is received to the end. Thus the cut-through system performs relay processing at a high speed.

But in the relay processing of the message executed by the relay connection unit in the cut-through system, as shown in FIG. 9, when the relay connection unit sends a message received from one communication line (bus) which is the receiving side at a transmission speed of 250 kpbs to other communication line (bus) which is the destination at a transmission speed of 500 kbps, the message reception speed is lower than the message transmission speed. Therefore data of a message to be sent is not received, and there arises a problem that a state in which there is no data to be sent is generated.

When the state where there is no data to be sent is generated, the relay connection unit suspends the relay processing. As a result, a problem that an error is generated on the bus arises.

Patent document 1: Japanese Patent Application Laid-Open No. 9-162917

DISCLOSURE OF THE INVENTION

Problem to be Solved by the Invention

The present invention has been made in view of the above-described problems. It is an object of the present invention to prevent the generation of a state in which there is no data to be sent and efficiently send messages when a relay connection unit relays messages received from receiving-side communication lines to a sending-side communication line having a higher transmission speed than the receiving-side communication lines by using a cut-through system.

Means for Solving the Problem

To solve the above-described problems, the present invention provides a relay connection unit, to be mounted on a car, which relays messages received from electronic control units connected to a plurality of first CAN communication lines respectively to electronic control units connected to a second CAN communication line having a higher transmission speed than the first CAN communication line in a cut-through system, the relay connection unit comprising a sending/receiving part connected to the first CAN communication lines and the second CAN communication line; and a relay processing part connected to the sending/receiving part, wherein regarding messages the relay processing part receives simultaneously from a plurality of the first CAN communication lines, from a time difference between a finish time point when reception of a control field of one of the messages has finished earliest and each of finish time points when receptions of control fields of other messages have finished and a transmission wait time period from the finish time point when the reception of the control field of each of the messages has finished, the relay processing part finds a sum of said transmission wait time period and said time difference at said reception finish time points for each message and first relays one of said messages having the smallest sum of said transmission wait time period and said time difference to said second CAN communication line.

According to the above-described construction, when the destination to which a plurality of messages simultaneously received from a plurality of the first CAN communication lines is relayed to the second CAN communication line, after the transmission wait time period elapses from the finish time point when the reception of the control field of the message to be first relayed to the second CAN communication line has finished, the relay processing part starts to relay the message to the second CAN communication line.

The transmission wait time period is (a reception period of time necessary for finishing reception of remaining bits of each message)−(a transmission period of time necessary for transmitting a total number of bits of the message to the second CAN communication line).

Thereby at the finish time point when the relay connection unit has finished the reception of the message from the first CAN communication lines, the transmission of the message to the second CAN communication line has not finished.

Thus when the relay connection unit relays the message 130 received from the first CAN communication lines to the second CAN communication line having a higher transmission speed than the first CAN communication lines in the cut-through system, it is possible to prevent the generation of a state in which there is no data to be sent.

At this time, in order for the relay connection unit to relay a plurality of messages received simultaneously from a plurality of the first CAN communication lines to the second CAN communication line, it is necessary to decide which of the messages should be preferentially sent to the second CAN communication line.

Generally the transmission order of messages is decided according to the order they were received or a priority set for each message.

But when a message which requires a longer transmission wait time period than other messages from the finish time point when the reception of the control field thereof has finished is first sent to the second CAN communication line, a message which requires a short transmission wait time period must wait till the transmission wait time period elapses. Thus the transmission wait time period is wasted.

In the present invention, of messages simultaneously received from a plurality of the first CAN communication lines, the relay processing part finds the time difference between the finish time point t1 when the reception of the control field of the message which has finished earliest and each of the finish time points when the receptions of the control fields of other messages have finished and the transmission wait time period from the finish time point when the reception of the control field of each of the messages has finished. Further by setting the finish time point t1 when the reception of the control field of the message which has finished earliest as the reference time point, the relay processing part finds the period of time required before the message is started to be sent, i.e., finds the sum of the transmission wait time period and the time difference at the reception finish time points for each message and first relays one of the messages having the smallest sum of the transmission wait time period and the time difference to the second CAN communication line.

As described above, the finish time point t1 when the reception of the control field of the message which has finished earliest of all messages is set as the reference time point. Thus by first relaying the message which requires the shortest period of time before the transmission of the message to the second CAN communication line, it is possible to prevent the transmission wait time period from being wasted.

Because the transmission wait time period is not wasted, the relay connection unit is capable of promptly completing the relay transmission of all messages to the second CAN communication line when the relay connection unit receives messages simultaneously from a plurality of the first CAN communication lines. Thus the relay connection unit is capable of relaying messages at a high time efficiency.

For each message, the relay processing part finds the sum of the transmission wait time period and the time difference at the reception finish time points. When the transmission wait time period is a negative value, the relay processing part sets the transmission wait time period as zero and finds the sum of the transmission wait time period and the time difference at the reception finish time point.

Regarding a message in which the reception of the control field has finished earliest, the time difference at the reception finish time point is zero.

The transmission speed of the first communication line or that of the second communication line 32 is any one of 125 kbps, 250 kbps, 500 kbps, and 1 Mbps. These transmission speed are generally used.

Effect of the Invention

As described above, according to the relay connection unit of the present invention to be mounted on a car, the relay connection unit simultaneously receives messages from a plurality of the first CAN communication lines. When the destination to which the messages are relayed is the second CAN communication line, of received messages, a message to be transmitted first is started to be sent thereto by delaying the transmission time by the transmission wait time period from the time point when the reception of the control field has finished. Thereby at the time point when the relay connection unit has received the message from the first CAN communication lines, the transmission of the message to the second CAN communication line has not finished. Thus when the relay connection unit relays the message received from the first CAN communication lines to the second CAN communication line having a higher transmission speed than the first CAN communication lines in the cut-through system, it is possible to prevent the generation of a state in which there is no data to be sent.

In the present invention, of messages received simultaneously from a plurality of the first CAN communication lines, the finish time point t1 when the reception of the control field of the message which has finished earliest of all messages is set as the reference time point. Thus by first relaying the message which requires the shortest period of time before the transmission of the message is started to the second CAN communication line, it is possible to prevent the transmission wait time period from being wasted.

BRIEF DESCRIPTION OF THE DRAWINGS

FIG. 5(A) is an explanatory view for explaining a case in which a message having a smaller sum of the time difference and the transmission wait time period is relayed to a second communication line earlier than other message; and FIG. 5(B) is an explanatory view for explaining a case in which relay 245 transmission is started in the order messages were received.

FIG. 6 shows table T indicating the number of transmission wait bits X for a transmission speed ratio and the data length of a data field.

FIG. 7 shows table T indicating the number of transmission wait bits X for a transmission speed ratio and the data length of a data field when an extended format is used.

DESCRIPTION OF REFERENCE SYMBOLS AND NUMERALS

Figure 1:
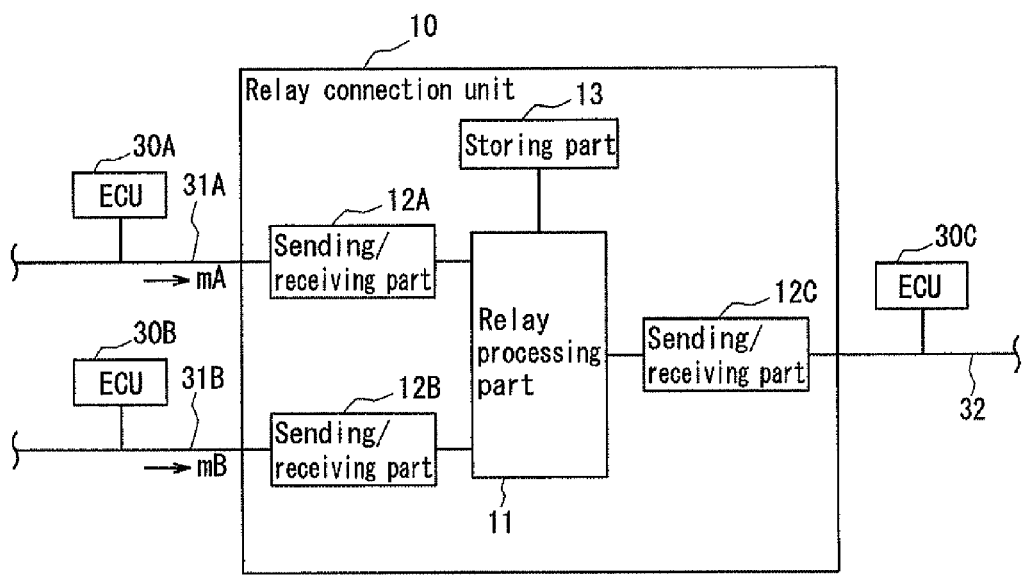
FIG. 1 is a construction view of a communication system in which a relay connection unit is connected with communication lines.

10: relay connection unit
11: relay processing part

12: sending/receiving part
13: storing part
30: electronic control unit (ECU)
31A: first communication line
31B: first communication line
32: second communication line
42: arbitration field
43: control field
X(XA, XB): number of transmission wait bits
TX(TXA, TXB): transmission wait time period
T: table
R(RA, RB): transmission speed ratio
M (mA, mB): message

BEST MODE FOR CARRYING OUT THE INVENTION

The embodiments of the present invention are described below with reference to the drawings.

FIGS. 1 through 7 show the first embodiment of the present invention.

A relay connection unit 10 to be mounted on a car is connected to a first communication line 31A, a first communication line 31B, and a second communication line 32. An ECU 30A, an ECU 30B, and an ECU 30C are connected to the first communication line 31A, the first communication line 31B, and the second communication line 32 respectively. In this way, a communication system 20 is constructed. The relay connection unit 10 relays messages m sent and received among ECUs 30 belonging to different communication lines. A communication protocol used is CAN (Controller Area Network).

The transmission speed of the second communication line 32 is set faster than that of the first communication lines 31A and 31B. In the first embodiment, the transmission speed of the first communication line 31A and that of the first communication line 31B are set equally to each other. The transmission speed of the first communication line 31A and 29B that of the first communication line 31B may be different from each other.

The relay connection unit 10 simultaneously receives a message mA from the ECU 30A connected to the first communication line 31A and a message mB from the ECU 30B 30B connected to the first communication line 31B and relays the messages mA, mB to the second communication line 32 in the cut-through system.

The relay connection unit 10 has a relay processing part 11, sending/receiving parts 12A, 12B, and 12C, and a storing part 13.

The relay processing part 11 is connected to the sending/receiving parts 12A, 12B, and 12C and the storing part 13. Upon reception of the message m from the ECUs 30A, 30B connected to the first communication lines 31A, 31B respectively via the sending/receiving parts 12A, 12B, the relay connection unit 10 reads an identifier (ID) from an arbitration field 42 of the message m. By reading the ID and using a routing map, the relay connection unit 10 determines the second communication line 32 to which the message m is to be sent.

The relay processing part 11 finds a transmission wait time period TX of the messages mA, mB simultaneously received thereby from the number of transmission wait bits X described later and finds a time difference Tdiff between a time point when reception of a control field 43 of the message m has finished earliest and each of time points when reception of the control field 43 of other message m has finished. Based on the time difference Tdiff and the transmission wait time period TX, the relay connection unit 10 decides which of the messages mA, mB is to be earlier sent to the second communication line 32. The method of deciding the message m to be sent is described later.

Of the messages mA, mB, the relay processing part 11 starts the relay transmission of the message m to be earlier sent, after counting the number of transmission wait bits X at the transmission speed of the first communication line 31 which has received the message m from the time point when the reception of the control field 43 has finished.

The relay processing part 11 sends the remaining message m of the messages mA, mB after the transmission of the message m earlier sent finishes.

The storing part 13 stores a table T in which the number of transmission wait bits X is described. The number of transmission wait bits X for a transmission speed ratio R, namely, the number of transmission wait bits X for (the transmission speed of the second communication line 32)/(the transmission speed of the first communication line 31A) or (the transmission speed of the second communication line 32)/(the transmission speed of the first communication line 31B) and for the data length of a data field 44 of the message m are described in the table T. The details of the table T are described later.

The storing part 13 stores the routing map to be used for the relay processing to be executed by the relay processing part 11.

The sending/receiving part 12A is connected to the first communication line 31A. The sending/receiving part 12B is connected to the first communication line 31B. The sending/receiving part 12C is connected to the second communication line 32. The sending/receiving part 12 sends and receives the message m via each communication line.

The relay connection unit 10 is constructed of a microcomputer (not shown) and a CAN controller (not shown). The CPU of the microcomputer constructs the relay processing part 11. The ROM or the RAM of the microcomputer constructs the storing part 13. The CAN controller constructs the sending/receiving part 12. The relay processing part 11 may be constructed of hardware such as an LSI for use in the relay connection unit 10.

Figure 2:
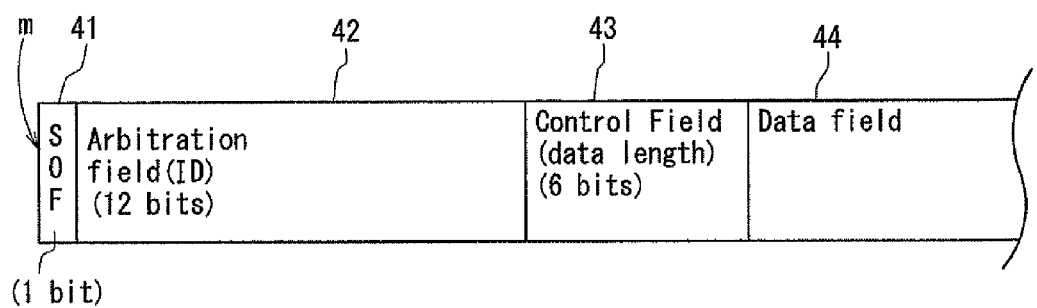
FIG. 2 is an explanatory view of the format of a message.

The format of the message m the relay connection unit 10 sends and receives is described below. As shown in FIG. 2, describing fields of the message m in the order from a higher-bit field to a lower-bit field, the frame of the message m has a start of frame (SOF) field 41 indicating the start of the message frame, the arbitration field 42 storing the message m identifier (ID), the control field 43 storing the data length (DLC) of the data field 44, and the data field 44 indicating the content (data) of the message m sent and received.

The message m conforms to a CAN protocol and has a standard format. Therefore the arbitration field 42 is set to 12 bits. The control field 43 is set to six bits. The SOF field 41 is set to one bit. The data length of the data field 44 varies according to the message m. The data length of the data field 44 is stored in bytes in the control field 43.

The number of transmission wait bits X and the transmission wait time period TX are described below by exemplifying a case in which the message m received from the first communication line 31A is relayed to the second communication line 32.

Figure 3:
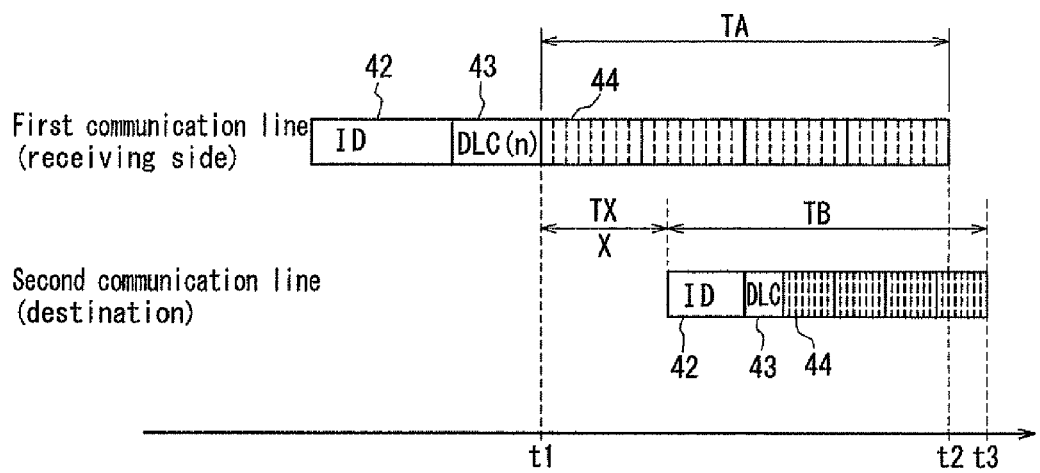
FIG. 3 is an explanatory view of a transmission wait time period.

As shown in FIG. 3, at a finish time point t1 when the relay connection unit 10 has finished the reception of the control field 43 of the message m from the first communication line 31A, the relay connection unit 10 has finished the reception of the arbitration field 42 and the control field 43 and receives the data field 44.

The relay processing part 11 starts to send the message m to the second communication line 32 at a time point when the number of transmission wait bits X has elapsed at the transmission speed of the first communication line 31A from the finish time point t1 when the reception of the control field 43 has finished, namely, after the transmission wait time period TX elapses.

At this time, the number of transmission wait bits X is so set that the transmission of the message m to the second communication line 32 does not finish at a time point t2 when the relay connection unit 10 has finished the reception of the message m from the first communication line 31A. That is, the number of transmission wait bits X is so set that the finish time point t2 when the message m received from the first communication line 31A has finished is earlier than a finish time point t3 when the transmission of the message m to the second communication line 32 has finished.

Therefore as shown in FIG. 3, the number of transmission wait bits X is the number of bits X counted from the finish time point t1 when the reception of the control field 43 of the message mA from the first communication line 31A has finished till a time point when the relay connection unit 10 starts to relay the message mA to the second communication line 32.

By counting the number of bits of the message mA received from the first communication line 31A, the relay processing part 11 counts the number of transmission wait bits XA. For example, when the number of transmission wait bits XA is 10 bits, as shown in FIG. 3, after the relay processing part 11 counts 10 bits of the message m received from the first communication line 31A from the finish time point t1 when the reception of the control field 43 has finished, the relay processing part 11 starts to relay the message mA to the second communication line 32.

The period of time in which the number of transmission wait bits XA elapses at the transmission speed of the first communication line 31A is set as a transmission wait time period TXA.

When the transmission wait time period is a negative value, the above-described transmission wait time period is set as zero.

Similarly the number of bits X from the finish time point t1 when the reception of the control field 43 of the message mB from the first communication line 31B has finished till a time point when the relay connection unit 10 starts to relay the message mB to the second communication line 32 is set as a number of transmission wait time bits XB. The period of time in which the number of transmission wait bits XB elapses at the transmission speed of the first communication line 31B is set as a transmission wait time period TXB.

Description is made below, on the method of deciding the message m to be preferentially sent to the second communication line 32 when the relay connection unit 10 simultaneously receives the messages m from the first communication line 31 and the first communication line 31B.

Figure 4:
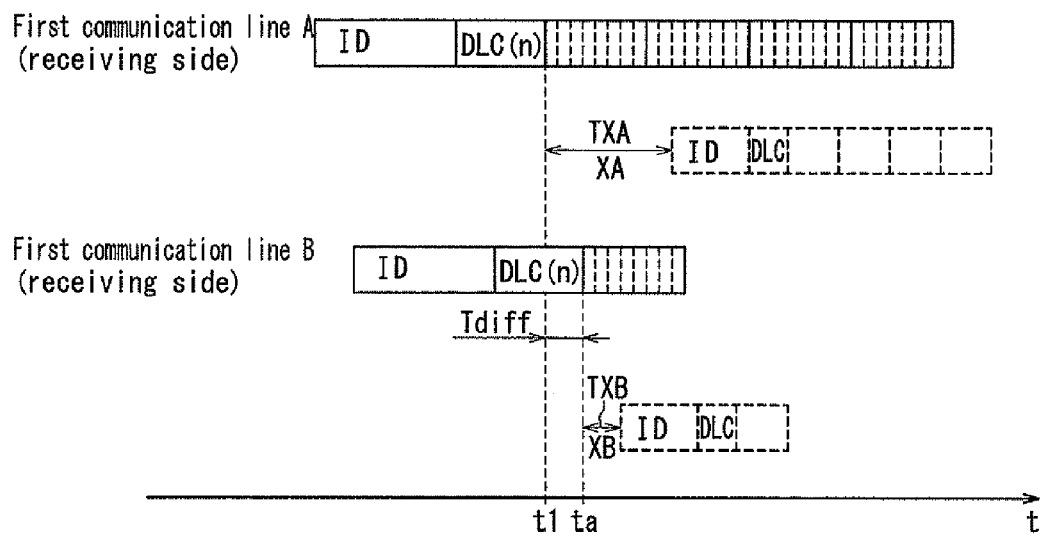
FIG. 4 is an explanatory view of a transmission wait time period of a message received from a plurality of first communication lines and a time difference at finish time points when receptions of control fields have finished.
Figure 8:
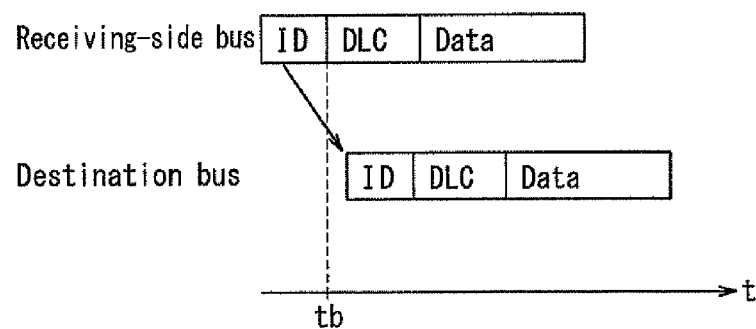
FIG. 8 is an explanatory view of a cut-through system.
Figure 9:
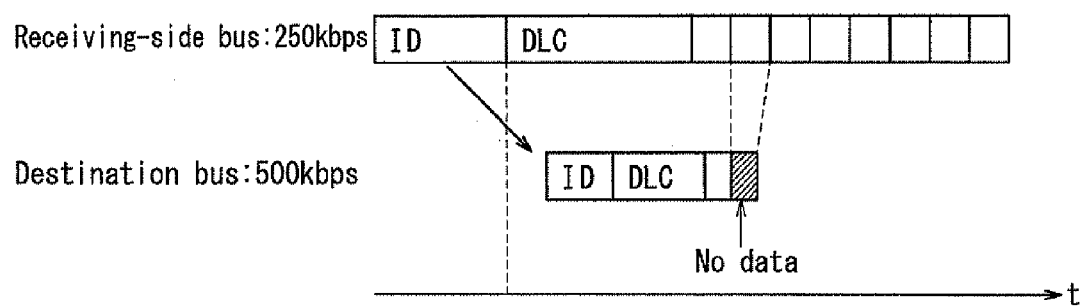
FIG. 9 shows a state in which there is no data to be sent.

As shown in FIG. 4, a case in which the finish time point t1 when the reception of the control field 43 of the message mA from the first communication line 31A has finished is earlier than a finish time point to when the reception of the control field 43 of the message mB from the first communication line 31B has finished is exemplified.

At this time, after the finish time point t1 when the reception of the control field 43 of the message mA has finished, the relay processing part 11 calculates the transmission wait time period TXA of the message mA received from the first communication line 31A. The transmission wait time period TXA is found by (number of transmission wait bits XA of message mA)/(transmission speed of first communication line 31A).

The relay processing part 11 also calculates the transmission wait time period TXB after the finish time point ta when the reception of the control field 43 of the message mB from the first communication line 31B has finished. The transmission wait time period TXB is found by (number of transmission wait bits XB of message mB)/(transmission speed of first communication line 31B).

The relay processing part 11 also finds a time difference Tdiff between the finish time point when the reception of the control field of the message which has finished earliest and the finish time point when the reception of the control field of the other message has finished. The relay processing part 11 calculates the reception time difference Tdiff from the finish time point t1 when the reception of the control field 43 of the message mA has finished and the finish time point ta when the reception of the control field 43 of the message mB has finished.

By setting the finish time point t1 when the reception of the control field 43 of the message mA has finished as the reference time point, (transmission wait time period TX)+(reception time difference Tdiff) which is the period of time required before the message is sent is found.

Because the reception of the control field of the message mA from the first communication line 31A has finished early, the reception time difference Tdiff is zero. Thus after the transmission wait time period TXA elapses, it is possible to start the relay of the message mA to the second communication line 32. It is possible to start the relay of the message mB received from the first communication line 31B after (transmission wait time period TXB) (reception time difference Tdiff) elapses.

At this time, the relay processing part 11 compares the length of (transmission wait time period TXA)–(reception time difference Tdiff) and that of the transmission wait time period TXB with each other. When the length of the transmission wait time period TXB is shorter than that of (transmission wait time period TXA)–(reception time difference Tdiff), the message mB is sent to the second communication line 32 earlier than the message mA. When the length of the transmission wait time period TXB is longer than that of (transmission wait time period TXA)–(reception time difference Tdiff), the message mA is sent to the second communication line 32 earlier than the message mB.

The relay processing part 11 compares the length of (transmission wait time period TXB) (reception time difference Tdiff) and that of the transmission wait time period TXA with each other. When the length of (transmission wait time period TXB)+(reception time difference Tdiff) is shorter than that of the transmission wait time period TXA, the message mB is sent to the second communication line 32 earlier than the message mA. When the length of (transmission wait time period TXB) (reception time difference Tdiff) is longer than that of the transmission wait time period TXA, the message mA is sent to the second communication line 32 earlier than the message mB.

When the relay connection unit 10 simultaneously receives messages from the first communication lines 31A and 31B, by setting the time point when the reception of the control field 43 of any one of the messages m has finished earliest as the reference time point, the period of time from the reference time point till the time point when each message m can be relayed to the second communication line 32 is calculated. The relay of the message m which is shorter in the above-described period of time is started earlier than the message m which is longer in the above-described period of time.

FIG. 5(A) is an explanatory view for explaining a case in which when the transmission wait time period TXB is shorter than (transmission wait time period TXA)−(reception time difference Tdiff), the message mB is sent to the second communication line 32 earlier than the message mA. FIG. 5(B) is an explanatory view for explaining a case in which without using the present system, the relay processing part 11 sends messages to the second communication line 32 in the order the messages were received. A case in which messages are received in the order of the message mA of the first communication line A and the first communication line B is shown in FIG. 5.

In FIG. 5(A), after the transmission wait time period TXB elapses from the time point to when the reception of the control field 43 of the message mB has finished, namely, after the period of time of (transmission wait time period TXB) (reception time difference Tdiff) elapses from the time point t1 when the reception of the control field 43 of the message mA has finished, the relay processing part 11 sends the message mB to the second communication line 32.

At this time, the total delay period of time from the finish time point t2 when the reception of the message mA from the first communication line 31A has finished till a time point t4 when the relay transmission of the messages mA and mB to the second communication line 32 has finished is shorter than the total delay period of time from the finish time point t2 when the reception of the message mA has finished till a time point t5 shown in FIG. 5(B). The relay transmission of the messages m finishes promptly.

The method of finding the number of transmission wait bits X is described below by exemplifying a case in which the message mA received from the first communication line 31A is relayed to the second communication line 32.

As described above, the number of transmission wait bits X is so set that the finish time point t2 when the reception of the message m from the first communication line 31A has finished is earlier than the finish time point t3 when the transmission of the message m to the second communication line 32 has finished.

Therefore (the period of time TA required to receive the data field 44) should be shorter than (transmission wait time period TX)+(period of time TB required to send total number of bits of message m to the second communication line 32).

The period of time TA required to receive the data field 44 is found by (number of bits of data field 44)/(transmission speed of first communication line 31A). The data length of the data field 44 indicates the number of bits thereof.

By taking the transmission speed of the first communication line 31A as the reference, the transmission wait time period TX is found by (number of transmission wait bits X)/(transmission speed of first communication line 31A).

The period of time TB required to send the total number of bits of the message m to the second communication line 32 is found by (total number of bits of message m)/(transmission speed of second communication line 32).

From above, the number of transmission wait bits X is found as (number of bits of data field 44)−(total number of bits of message m/(transmission speed ratio R). The transmission speed ratio R is found by (transmission speed of second communication line 32)/(transmission speed of first communication line 31A).

In detail, the data length (number of bits) of the data field 44 is read from the control field 43. Because the data length is expressed in bytes, and one byte is eight bits, the data length (number of bits) of the data field 44 is 8×n bits when a read value is n.

The total number of bits of the message m is the sum of the number of bits of the SOF field 41, the arbitration (ID) field 42, the control (DLC) field 43, and the data field 44. As described above, because the number of bits of the arbitration field 42, the control field 43, and the SOF are set to 12 bits, six bits, and one bit respectively, the total number of bits of the message m is 19 bits, and the data length of the data field 44 is 8×n bits. Therefore the total number of bits of the message m is (19+8×n) bits.

The transmission speed of the first communication line 31A and that of the second communication line 32 are any one of 125 kbps, 250 kbps, 500 kbps, and 1 Mbps. Because the transmission speed of the first communication line 31A is lower than that of the second communication line 32, the transmission speed ratio R is any one of values of 2, 4, and 8.

A stuff bit is considered. In the communication system in which the CAN protocol is used, the ECU 30 and the relay connection unit 10 are incapable of receiving consecutive six bits having an equal value. In the case of consecutive five bits having an equal value, a stuff bit having one bit is inserted into the data field 44. Therefore the number of bits of the data field 44 is 8×n×6/5 at most. 6/5 is referred to as a bit stuff rate S.

The stuff bit is also inserted into the arbitration field 42 and the control field 43. But when the total number of bits of the message m is large, the total number of bits of the message m sent to the second communication line 32 is large. As a result, there is a delay in the finish time point t3 when the relay connection unit 10 finishes the transmission of the message m to the second communication line 32. In the present invention, the finish time point t2 when the reception of the message m from the first communication line 31A has finished is set earlier than the finish time point t3 when transmission of the message m to the second communication line 32 has finished. When the total number of bits of the message m is large, the calculation of the number of transmission wait bits X is not adversely affected. Thus in the first embodiment, only the stuff bit to be inserted into the data field 44 is considered.

Therefore the number of transmission wait bits X is (the number of bits of the data field 44—the total number of bits of the message m)/(the transmission speed ratio R) and expressed by an equation (1).

$$X = (8 \times n \times S) - (19 + 8 \times n \times S)/R \qquad \text{Equation (1)}$$

From the equation (1), the number of transmission wait bits X is a function of the transmission speed ratio R and the number of bits of the data field 44. As described above, the transmission speed ratio R is any one of 2, 4, and 8, and the data length of the data field 44 is 8×n bits, i.e., expressed by n bytes. The data field 44 of the message m of CAN takes a value of 0 byte to eight bytes.

Therefore by calculating the number of transmission wait bits X from the transmission speed ratio R and the number of bytes of the data length of the data field 44, results shown in table T of FIG. 6 are obtained. For example, when the transmission speed of the first communication line 31A, the transmission speed of the second communication line 32, and the number of bytes n of the data field 44 are 250 kbps, 500 kbps, and four bytes respectively, the transmission speed ratio R is 500/250=2. Thus the number of transmission wait bits X is 10 bits from FIG. 6.

The table T is calculated in advance and stored in the storing part 13.

Similarly, the number of transmission wait bits XB in relaying the message mB received from the first communication line 31B to the second communication line 32 is found from the number of bytes of the data length of the message m and (transmission speed of second communication line 32)/

(transmission speed of first communication line 31B) by using the equation (1) with reference to the table T.

The operation of the relay connection unit 10 is described below.

The relay connection unit 10 receives the messages mA 665 and mB simultaneously from the first communication lines 31A and 31B respectively. Upon reception of the arbitration field 42 of the message m, the relay processing part 11 reads the ID of the message m and determines the communication line to which the message m is to be sent with reference to the routing map of the storing part 13. In the first embodiment, both the messages mA and mB are sent to the second communication line 32.

Thereafter a transmission speed ratio RA is found from the transmission speed of the first communication line 31A which is the receiving side and that of the second communication line 32 which is the destination. A transmission speed ratio RB is found from the transmission speed of the first communication line 31B which is the receiving side and that of the second communication line 32 which is the destination. The transmission speed ratios RA and RB may be stored in advance or the transmission speed of each communication line may be stored and calculation may be performed each time the message m is received.

Let it be supposed that the finish time when the reception of the control field 43 of the message mA has finished is earlier than the finish time when the reception of the control field 43 of the message mB has finished. At this time, when the reception of the control field 43 of the message mA finishes, the relay processing part 11 reads the number of bytes n indicating the data length of the data field 44 from the control field 43.

With reference to the table T of the storing part 13, the relay processing part 11 reads the number of transmission wait bits XA from the number n of bytes of the data field 44 and the transmission speed ratio RA and calculates the transmission wait time period TXA from (number of transmission wait bits XA of message mA)/(transmission speed of first communication line 31A).

Upon completion of the reception of the control field 43 of the message mB, the relay processing part 11 reads the number n of bytes indicating the data length of the data field 44 from the control field 43, reads the number of transmission wait bits XB from the number n of bytes of the data field 44 and the transmission speed ratio RB with reference to the table T of the storing part 13, and calculates the transmission wait time period TXB from (number of transmission wait bits XB of message mB)/(transmission speed of first communication line 31B).

The relay processing part 11 calculates the reception time difference Tdiff from the time point t1 when the reception of the control field 43 of the message mA has finished and the time point to when the reception of the control field 43 of the message mB has finished to calculate (transmission wait time period TXA of the message mA)−(reception time difference Tdiff)].

The arithmetic processing part compares (transmission wait time period TXA)−(reception time difference Tdiff) and the transmission wait time period TXB of the message mB with each other.

When (transmission wait time period TXA)−(reception time difference Tdiff) is shorter than the transmission wait time period TXB, after the relay processing part 11 counts the number of transmission wait bits XA of the message mA sent from the first communication line 31A from the time point t1 when the reception of the control field 43 of the message m has finished, the relay processing part 11 starts to relay the message mA to the second communication line 32.

It is possible to calculate (transmission wait time period TXB of message mB)+(reception time difference Tdiff) and compare the calculated result with the transmission wait time period TXA of the message mA. In this case, when (transmission wait time period TXB of message mB)+(reception time difference Tdiff) is longer than the transmission wait time period TXA, the message mA is sent to the second communication line 32 earlier than the message mB.

After the relay transmission of the message mA finishes, the relay processing part 11 starts the relay transmission of the message mB. At this time, the relay processing part 11 checks whether a wait time from the time point to when the reception of the control field 43 of the message mB has finished till the time point when the transmission of the message mB starts exceeds the transmission wait time period TXB of the message mB. When the wait time does not exceed the transmission wait time period TXB of the message mB, the relay processing part 11 starts the relay after the transmission wait time period TXB elapses.

When the transmission wait time period TXB of the message mB is shorter than the wait time, the relay processing part 11 starts to relay the message mB to the second communication line 32 after the relay processing part 11 counts the number of transmission wait bits XB of the message mB received from the first communication line 31B from the time point to when the reception of the control field 43 of the message mB has finished. When the relay transmission of the message mB has finished, after checking whether the wait time from the time point t1 when the reception of the control field 43 of the message mA has finished till the time point when the relay processing part 11 starts to send the message mA exceeds the transmission wait time period TXA of the message mA, the relay processing part 11 starts the relay transmission of the message mA.

According to the present invention, the relay connection unit 10 simultaneously receives messages m from a plurality of the first communication lines 31. When the destination to which the messages m are relayed is the second communication line 32, of received messages m, a message m to be transmitted first is started to be sent thereto by delaying the transmission time by the transmission wait time period TX from the time point when the reception of the control field 43 has finished. Thereby at the time point when the relay connection unit 10 has received the message m from the first communication line 31, the transmission of the message m to the second communication line 32 has not finished. Thus when the relay connection unit 10 relays the message m received from the first communication line 31 to the second communication line 32 having a higher transmission speed than the first communication line 31 in the cut-through system, it is possible to prevent the generation of a state in which there is no data to be sent.

In the present invention, by setting the finish time point t1 when the reception of the control field 43 of the message mA has finished earliest of all messages m simultaneously received from a plurality of the first communication lines 31 as the reference time point, the message m which requires the shortest period of time before the transmission of the message m is started is first relayed to the second communication line 32. Thus the wasting of the transmission wait time period is prevented.

In the first embodiment, the relay connection unit 10 simultaneously receives the messages m from the two first communication lines 31A, 31B having a lower transmission speed than the second communication line 32. The relay connection unit 10 may simultaneously receive messages m from not less than three first communication lines 31.

For example, when the relay connection unit 10 receives three messages in order of mA, mB, and mC, by setting the time point t1 when the reception of the control field 43 of the message mA has finished as the reference time point, which of the messages mA and mB should be sent earlier is determined at the time point to when the reception of the control field 43 of the message mB has finished. When any of the messages has not been sent at a time point when the reception of the control field 43 of the message mC has finished, which of the messages mA and mC should be sent earlier is determined. By determining which of the messages mB and mC should be sent earlier, the transmission order is decided among the messages mA, mB, and mC.

When transmission of any one of the messages mA and mB has been started, which of the remaining messages should be sent earlier is determined.

The number of transmission wait bits X may be found by calculating it from the number of bytes of the data field 44 and the transmission speed ratio R without storing the table T in the storing part 13 each time the message m is received.

It is possible to find the transmission wait time period TX from the period of time TA required to receive the data field 44 and the period of time TB required to send the total number of bits of the message m to the second communication line 32 each time the relay processing part 11 receives the message m and start the relay of the message m to the second communication line 32 after the transmission wait time period TX of the number of transmission wait bits X at the transmission speed of the first communication line 31A elapses from the time point when the reception of the control field 43 has finished.

Although the CAN message m used in the first embodiment is a standard format, an extended format may be used.

In the extended format, the arbitration field 42, the control field 43, and the SOF field are set to 32 bits, six bits, and one bit respectively. The number of transmission wait bits X is expressed by (the number of bits of the data field 44)−(total number of bits of the message m)/(transmission speed ratio R)=(8×n×S)−(39+8×n×S)/R.

Calculating the transmission wait time period X from the transmission speed ratio R and the number of bits of the data field 44, the transmission wait time period X is as shown in table T of FIG. 7.

Because other constructions and the operation and effect of this embodiment are similar to those of the first embodiment, the other constructions of this embodiment are denoted by the same reference symbols and numerals as those of the first embodiment, and the description thereof is omitted herein.

What is claimed is:

1. A relay connection unit, to be mounted on a car, which relays messages received from electronic control units connected to a plurality of first CAN communication lines respectively to electronic control units connected to a second CAN communication line having a higher transmission speed than said first CAN communication lines in a cut-through system, said relay connection unit comprising a sending/receiving part connected to said first CAN communication lines and said second CAN communication line; and a relay processing part connected to said sending/receiving part, wherein regarding messages said relay processing part receives simultaneously from a plurality of said first CAN communication lines, from a time difference between a finish time point when reception of a control field of one of said messages has finished earliest and each of finish time points when receptions of control fields of other messages have finished and a transmission wait time period from said finish time point when said reception of said control field of each of said messages has finished, said relay processing part finds a sum of said transmission wait time period and said time difference at said reception finish time points for each message and first relays one of said messages having the smallest sum of said transmission wait time period and said time difference to said second CAN communication line.

2. The relay connection unit mounted on a car according to claim 1, wherein said transmission wait time period to be calculated for each message is (a reception period of time necessary for finishing reception of remaining bits of each message)−(a transmission period of time necessary for transmitting a total number of bits of said each message to said second CAN communication line).

3. The relay connection unit mounted on a car according to claim 1, wherein when said transmission wait time period is a negative value, said relay processing part sets said transmission wait time period as zero and finds said sum of said transmission wait time period and said time difference at said reception finish time point.

4. The relay connection unit mounted on a car according to claim 2, wherein when said transmission wait time period is a negative value, said relay processing part sets said transmission wait time period as zero and finds said sum of said transmission wait time period and said time difference at said reception finish time point.

5. The relay connection unit mounted on a car according to claim 1, wherein after said transmission wait time period elapses from a time point when said reception of said control field of said message to be first relayed to said second CAN communication line has finished, said relay processing part starts to relay said message to said second CAN communication line.

6. The relay connection unit mounted on a car according to claim 2, wherein after said transmission wait time period elapses from a time point when said reception of said control field of said message to be first relayed to said second CAN communication line has finished, said relay processing part starts to relay said message to said second CAN communication line.

7. The relay connection unit mounted on a car according to claim 3, wherein after said transmission wait time period elapses from a time point when said reception of said control field of said message to be first relayed to said second CAN communication line has finished, said relay processing part starts to relay said message to said second CAN communication line.

8. The relay connection unit mounted on a car according to claim 1, wherein a transmission speed of said first CAN communication line or that of said second CAN communication line is any one of 125 kbps, 250 kbps, 500 kbps, and 1 Mbps.

9. The relay connection unit mounted on a car according to claim 2, wherein a transmission speed of said first CAN communication line or that of said second CAN communication line is any one of 125 kbps, 250 kbps, 500 kbps, and 1 Mbps.

10. The relay connection unit mounted on a car according to claim 3, wherein a transmission speed of said first CAN communication line or that of said second CAN communication line is any one of 125 kbps, 250 kbps, 500 kbps, and 1 Mbps.

11. The relay connection unit mounted on a car according to claim 5, wherein a transmission speed of said first CAN communication line or that of said second CAN communication line is any one of 125 kbps, 250 kbps, 500 kbps, and 1 Mbps.

* * * * *